United States Patent
Taoka

[11] Patent Number: 5,872,508
[45] Date of Patent: Feb. 16, 1999

[54] ELECTRONIC FLASHER SYSTEM

[75] Inventor: Tetsuo Taoka, Tokyo, Japan

[73] Assignee: Niles Parts Co., Ltd., Japan

[21] Appl. No.: 845,460

[22] Filed: Apr. 25, 1997

[30] Foreign Application Priority Data

May 13, 1996 [JP] Japan .................................. 8-141132

[51] Int. Cl.$^6$ .................................................. B60Q 1/00
[52] U.S. Cl. ........................ 340/436; 340/692; 340/460; 340/903
[58] Field of Search ...................... 340/692, 460, 340/466, 474, 903, 331, 461, 436

[56] References Cited

U.S. PATENT DOCUMENTS

| | | | |
|---|---|---|---|
| 3,576,444 | 4/1971 | Roberts et al. | 340/471 |
| 3,859,629 | 1/1975 | Komiyama et al. | 340/692 |
| 4,359,713 | 11/1982 | Tsunoda | 340/460 |
| 5,293,152 | 3/1994 | Bussin et al. | 340/435 |
| 5,339,075 | 8/1994 | Abst et al. | 340/436 |
| 5,345,218 | 9/1994 | Woods et al. | 340/454 |
| 5,355,118 | 10/1994 | Fukuhara | 340/436 |
| 5,635,903 | 6/1997 | Koike et al. | 340/692 |

FOREIGN PATENT DOCUMENTS

| | | |
|---|---|---|
| 55-87630 | 7/1980 | Japan . |
| 64-90831 | 4/1989 | Japan . |
| 2-164629 | 6/1990 | Japan . |

*Primary Examiner*—Jeffery A. Hofsass
*Assistant Examiner*—Anh La
*Attorney, Agent, or Firm*—Ronald P. Kananen; Rader, Fishman & Grauer

[57] ABSTRACT

An electronic flasher system adapted to change an operating sound in dependence on situations surrounding a vehicle when the vehicle changes its direction or lane, so that the driver can grasp the situations surrounding the vehicle by merely listening to such operating sound. The flasher system includes a flasher circuit 21A connected with a sound generator 3 for generating operating sound, and a situation detecting sensor 6 for outputting an output signal in dependence on a running state of the vehicle. The flasher circuit 21A causes a change of the turn-signal operating sound generated by the sound generator 3 in accordance with an obstacle detection signal from an obstacle sensor 61 and a vehicle speed detection signal from a vehicle-speed sensor 62.

14 Claims, 2 Drawing Sheets

ELECTRONIC FLASHER SYSTEM

BACKGROUND OF THE INVENTION

1. Field of the Invention

The present invention relates generally to electronic flasher systems and, in particular, to an improved electronic flasher system in which a semiconductor switch device is intermittently operated depending on manipulation of a turn-signal switch and a hazard switch, thereby causing turn-signal flashing or hazard flashing by direction indicator lamps.

2. Description of the Related Art

Conventional electronic flasher systems are disclosed, for example, in Japanese Unexamined Patent Publication (Kokai) No. S64-90831 and Japanese Unexamined Patent Publication (Kokai) No. H2-164629. These conventional systems involve a semiconductor switch device connected to lamps, a flasher circuit for transmitting an intermittent signal to the semiconductor switch device, and a switch connected to the flasher circuit. The semiconductor switch device is intermittently operated in accordance with an operation of the switch, thereby causing the lamps to flash.

In such an electronic flasher system, the semiconductor switch device itself does not generate an operating sound. For enabling confirmation of flashing, an operating sound is generated in relation to the operating states of the flasher system by utilizing car stereo speakers, as disclosed, for example, by Japanese Unexamined Patent Publication No. S55-87630. Alternatively, a buzzer has been provided exclusively for generating an operating sound in an electronic flasher system.

However, in the conventional flasher system of the mechanical or electronic type, operating sound is merely generated responsive to flashing of the direction indicator lamps. Accordingly, it is impossible to obtain other information from the operating sound.

SUMMARY OF THE INVENTION

It is an object of the present invention to provide an electronic flasher system that solves the problems associated with the conventional flasher systems described above.

It is a further object of the present invention to provide an electronic flasher system which is adapted to change operating sound depending on situations surrounding the vehicle, when the vehicle changes its direction or lane, so that the driver can discern the situations surrounding the vehicle by merely listening to such operating sound.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, an electronic flasher system is provided comprising: a flasher circuit for transmitting an intermittent signal; direction indicator lamps arranged to turn-signal flash based on the intermittent signal; a sound generator for generating turn-signal operating sound; and a sensor for outputting an output signal depending on a running state of a vehicle; whereby the turn-signal operating sound generated by the sound generator is changed in accordance with the output signal from the sensor.

The sensor can be provided with an obstacle sensor for detecting an obstacle existing around the vehicle, and the turn-signal operating sound generated by the sound generator can be changed in accordance with an obstacle detection signal from the obstacle sensor.

Further, the turn-signal operating sound generated by the sound generator can be changed in accordance with both an obstacle detection signal from an obstacle sensor and a vehicle-speed detection signal from a vehicle-speed sensor.

Moreover, the direction indicator lamps can be connected to a semiconductor switch device, and the semiconductor switch device can cause the direction indicator lamps to turn-signal flash.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figure 1:
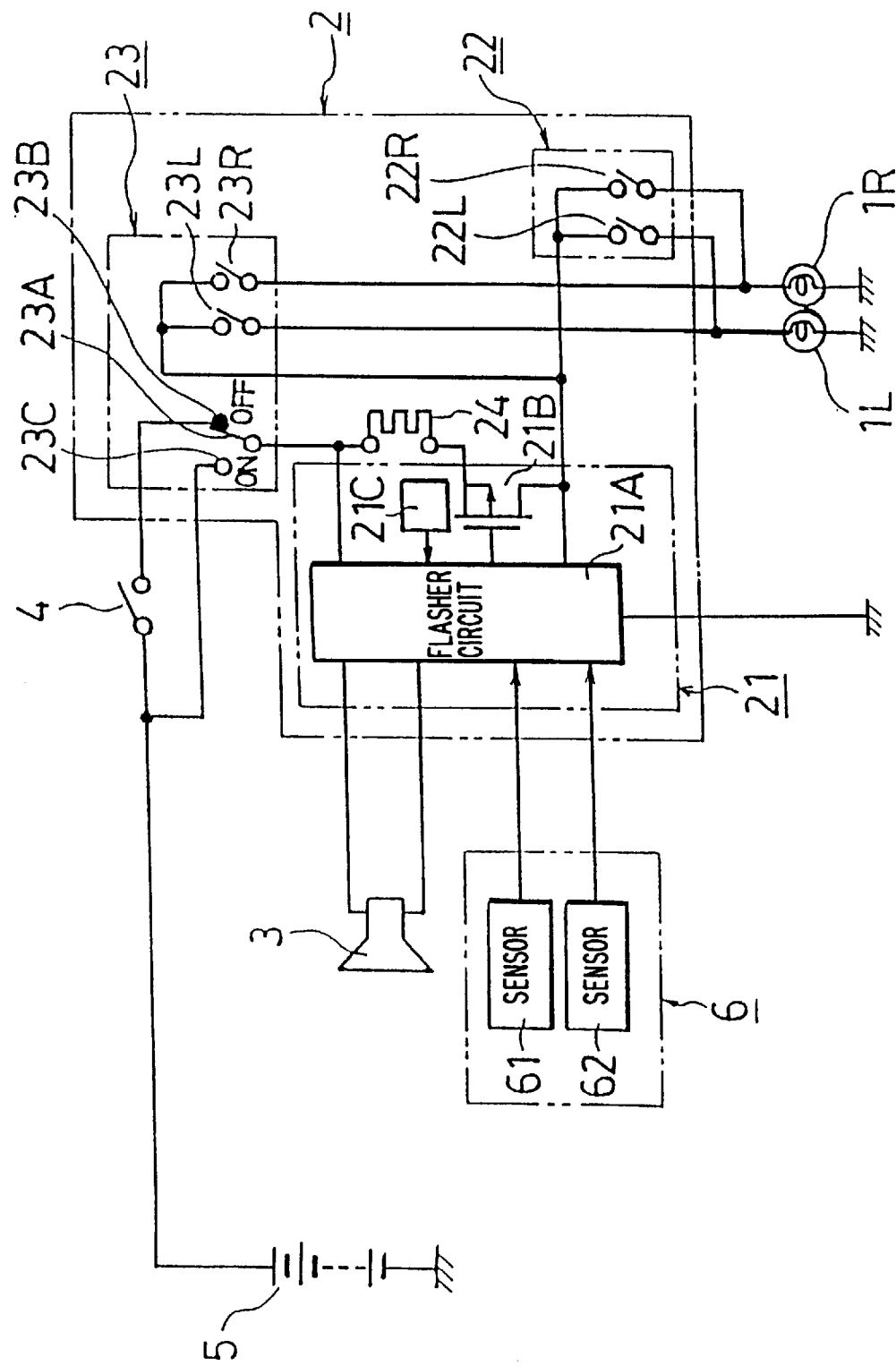
FIG. 1 is an electric circuit diagram showing a preferred embodiment of the present invention.

A preferred embodiment of the present invention will now be described with reference to FIGS. 1 and 2 of the accompanying drawings.

An electronic flasher system according to the preferred embodiment includes existing direction indicator lamps 1R and 1L provided on the left and right sides of a vehicle body, respectively. The direction lamps 1R, 1L are electrically connected through a harness to a combination switch body 2 provided on a steering column in the vehicle body. The combination switch body 2 is a switch which contains various operating switches, such as lighting-system operating switches, wiper-system operating switches, and turn-signal-system switches.

The combination switch body 2 includes a flasher circuit 21A, a semiconductor switch device 21B, a device-temperature detecting section 21C, a turn-signal switch 22, a hazard switch 23, and an electromagnetic wave detecting resistance 24.

The flasher circuit 21A is a circuit for controlling the semiconductor switch device 21B and a sound generator 3, depending on the state of signals inputted from the turn-signal switch 22, the hazard switch 23, the electric-current detecting resistance 24, a sensor 6, and the device-temperature detecting section 21C.

Specifically, the flasher circuit 21A functions to output respective intermittent signals to the semiconductor switch device 21B to cause the right-side direction indicator lamp 1R or the left-side indicator lamp 1L to turn-signal flash, and to cause the sound-generator 3 to generate signal-operating sounds, when an ON operating signal is inputted through a right-side contact 22R or a left-side contact 22L of the turn-signal switch 22, respectively.

The flasher circuit 21A also functions to alter the turn-signal sound generated by the sound generator 3, in dependence on an output signal from the sensor 6. For instance, the flasher circuit 21A makes the intermittent period of a turn-signal operating sound vary depending on an obstacle detecting signal inputted from an obstacle sensor 61. The flasher circuit 21A also makes the frequency of the turn-signal operating sound vary in accordance with a vehicle-speed detecting signal inputted from the vehicle-speed sensor 62 of the sensor 6. Thus, the driver can be alerted of situations surrounding the vehicle by merely listening to the turn-signal operating sound, for example, during a change of vehicle direction or running lanes.

When the flasher circuit 21A detects, from a temperature-detecting signal inputted from the device-temperature detecting section 21C, that the heated temperature of the semiconductor switch device 21B has become higher than a first threshold level TH1, the flasher circuit 21A acts to suppress electric power imposed on the semiconductor switch device 21B by reducing the ON duty ratio, thereby preventing the semiconductor switch device 21B from being damaged by heat. The flasher circuit 21A brings the ON duty ratio back to the former value when the heated temperature of the semiconductor switch device 21B is cooled lower than a second threshold level TH2.

The flasher circuit 21A shifts into a hazard flashing mode when an ON operating signal is inputted from the hazard switch 23, and an OFF mode when an OFF operating signal is inputted therefrom. In the hazard flashing mode, the flasher circuit 21A outputs an intermittent signal to the semiconductor switch device 21B to cause the right and left direction indicating lamps 1R, 1L to hazard-flash simultaneously. In the OFF mode, no output is made, thereby turning both lamps 1R, 1L off. Incidentally, the flasher circuit 21A, while in the hazard flashing mode, is adapted to give no output to the sound generator 3.

The flasher circuit 21A detects a drop of voltage across the electric-current resistance 24. When the level of voltage drop falls below a predetermined level, the flasher circuit 21A judges that a direction indicating lamp 1R, 1L is broken of its circuit, and changes the period of the intermittent signal outputted to the semiconductor switch device 21B to inform of the circuit breakage.

The semiconductor switch device 21B employs a MOS FET so that it is integrated together with the flasher circuit 21A and the device-temperature detecting section 21C to constitute a module unit 21.

The turn-signal switch 22 is a switch that turns ON and OFF when a lever (not shown) provided on the combination switch main body 2 is tilted. The turn-signal switch 22 is formed by a right-side contact 22R and a left-side contact 22L. The hazard switch 23 is a switch (e.g., provided on an instrument panel), which is formed by a tumbler switch or the like. The hazard switch 23 contains a right-side contact 23R, a left-side contact 23L, a movable contact 23A, a normally closed contact 23B, and a normally opened contact 23C. The electric-current detecting resistance 24 is formed by a resistance with a low value for gaining a voltage drop of approximately 100 mV, whose value is proportional to an electric current flowing through the direction indicating lamps 1R, 1L.

The sound generator 3 is formed by a piezoelectric buzzer built into the combination switch main body 2, or an existing speaker or the like installed on the vehicle body. The sensor 6 is adapted to output various signals in accordance with the operating state of the vehicle. The sensor 6 includes an obstacle sensor 61 for detecting an obstacle present around the vehicle and a vehicle-speed sensor 62 for detecting a running speed of the vehicle.

The combination switch main body 2 is connected with an ignition switch 4 and a direct-current power supply 5, as well as the direction indicating lamps 1R, 1L, the sound generator 3, and the sensor 6.

The operation of the electronic flasher system according to the preferred embodiment will now be explained.

With the ignition switch 4 in an ON operating state and the hazard switch 23 in an OFF state, if the flasher circuit 21A is inputted with an ON operating signal through the right-side contact 22R or the left-side contact 22L of the turn-signal switch 22, it outputs an intermittent signal to the semiconductor switch device 21B. As a result, the right-side direction indicator lamp 1R begins turn-signal flashing when the right-side contact 22R is turned ON, whereas the left-side direction indicator lamp 1L performs turn-signal flashing when the left-side contact 22L is turned ON.

On this occasion, the flasher circuit 21A also outputs an intermittent signal to the sound generator 3 such that the operating sound is varied in accordance with an output signal from the sensor 6. For instance, when the flasher circuit 21A is inputted from the obstacle sensor 61 with an obstacle detecting signal representing the presence of an obstacle near the vehicle, the flasher circuit 21A outputs short intermittent signals, thereby changing the operating sound accordingly. When the flasher circuit 21A is inputted from the vehicle-speed sensor 62 with a vehicle-speed detecting signal representing a high running speed of the vehicle, the frequency of operating sound is increased. Accordingly, the driver can be alerted to situations surrounding the vehicle by merely listening to the operating sound of the sound generator 3 when changing a vehicle direction or running lane.

The flasher circuit 21A detects the heated temperature of the semiconductor switch device 21B based on a temperature detecting signal inputted from the device-temperature detecting section 21C. The flasher circuit 21A varies the ON duty ratio of the inputting intermittent signal to the semiconductor switch device 21B in accordance with the temperature. FIG. 2 is a time chart exemplifying the relation between the temperature detected by the device-temperature detecting section 21C and the ON duty ratio of the intermittent signal inputted to the semiconductor switch device 21B.

Figures 2A, 2B:
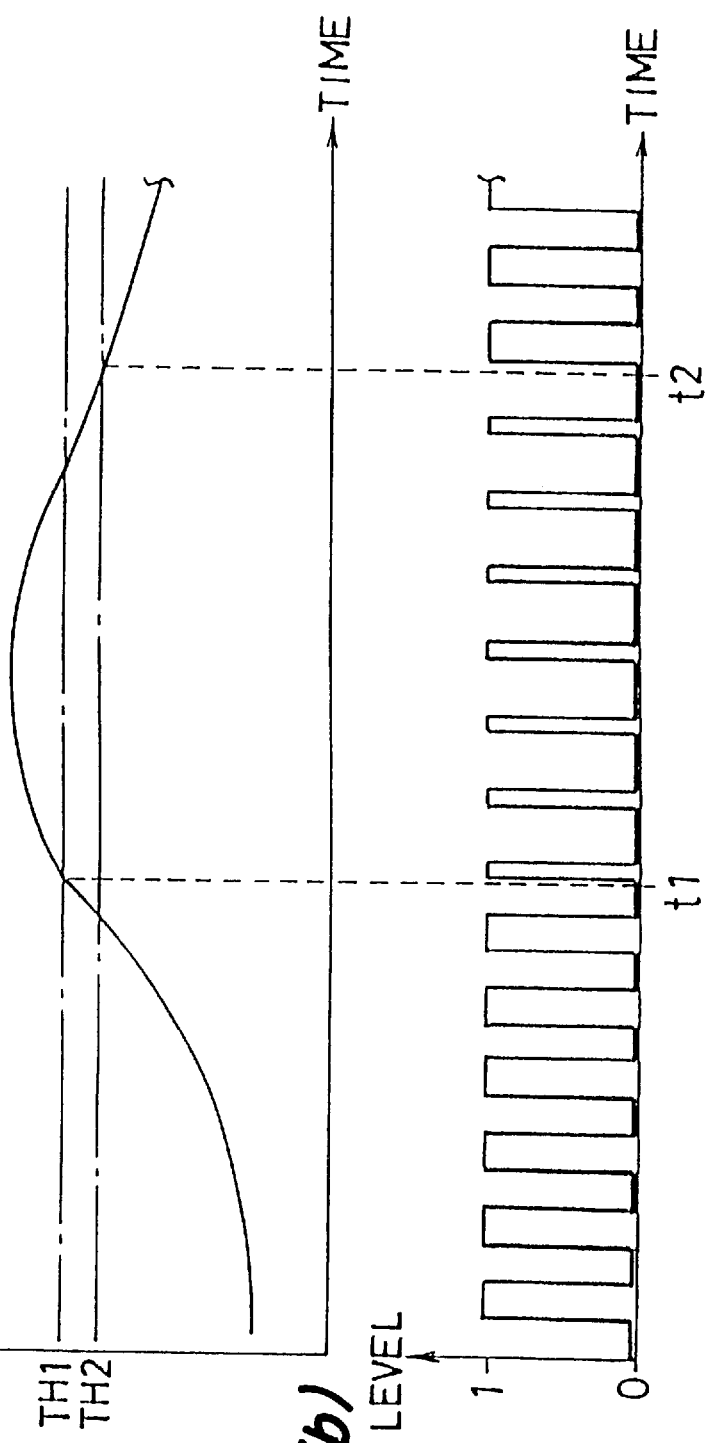
FIG. 2 is a time chart for explaining the function of the circuit shown in FIG. 1, wherein (a) shows a heated temperature of a semiconductor switch device, and (b) shows an intermittent signal inputted to the semiconductor switch device.

As shown in FIG. 2, the heated temperature is lower than the first threshold level TH1 up to time t1, so that the ON duty ratio of the intermittent signal inputted to the semiconductor switch device 21B is set to, for example, approximately 50%. When the heated temperature exceeds the first threshold value TH1 at the time t1, the ON duty ratio of the intermittent signal, which is inputted to the semiconductor switch device 21B, is changed to, for example, approximately 20%. By reducing the ON duty ratio of the intermittent signal, the semiconductor switch device 21B can be suppressed of electric power imposed thereon. As a result, the semiconductor switch device 21B is cooled and prevented from being damaged by heat. Thereafter, when the heated temperature becomes lower than a second threshold level TH2 at time t2, the ON duty ratio is returned to the former value of approximately 50%.

When the hazard switch 23 is switched to the ON position, the right-side and left-side contacts 23R, 23L are turned ON, and the movable contact 23A is brought into connection with the normally-open contact 23C. This brings the flasher circuit 21A into a hazard flashing mode, so that it outputs an intermittent signal to the semiconductor switch device 21B, thereby causing the direction indicator lamps 1R, 1L on the right and left sides to hazard-flash. By switching the hazard switch 23 to the OFF position, the flasher circuit 21A is turned to an OFF mode, whereby both of the lamps 1R, 1L are turned off.

The flashing circuit 21A detects a drop of voltage across the current detecting resistance 24 during the time period while the direction indicator lamps 1R, 1L perform turn-signal flashing or hazard flashing. When the level of the voltage drop is below a predetermined level, the flasher circuit 21A determines that a direction indicator lamp 1R, 1L has been broken of its circuit. The flasher circuit 21A is then operated to change the period of the intermittent signal outputted to the semiconductor switch device 21B. This makes it possible to alert the operator of a circuit-breakage or malfunction of the direction indicator lamps 1R, 1L.

The embodiment described above performs a control to reduce the ON duty ratio of intermittent signals being inputted to the semiconductor switch device when the heated temperature detected by the device-temperature detecting section exceeds a predetermined threshold level. However, the ON duty ratio can, alternatively, be continuously varied in proportion to an output from the device-temperature detecting section.

As stated above, an electronic flasher system according to the present invention comprises: a flasher circuit for transmitting an intermittent signal; direction indicator lamps arranged to turn-signal flash based on the intermittent signal; a sound generator for generating turn-signal operating sound; and a sensor for outputting an output signal depending on a running state of a vehicle; whereby the turn-signal operating sound generated by the sound generator is changed in accordance with the output signal from the sensor. This provides an effect that the driver can discern situations surrounding the vehicle by merely listening to the operating sound of the flasher system when the vehicle changes its direction or.

Also, the electronic flasher system according to the present invention is arranged such that the sensor is provided with an obstacle sensor for detecting an obstacle existing around the vehicle, and the turn-signal operating sound generated by the sound generator is changed in accordance with an obstacle detection signal from the obstacle sensor. This provides an effect that the driver can recognize the presence or absence of an obstacle around the vehicle by listening to the operating sound of the flasher system.

Further, the electronic flasher system is arranged such that the turn-signal operating sound generated by the sound generator is changed in accordance with both an obstacle detection signal from an obstacle sensor and a vehicle-speed detection signal from a vehicle-speed sensor. This provides an effect that the operating sound of the flasher system can be altered depending on the difference in dangerousness between the cases where an obstacle is detected during low-speed running and where an obstacle is detected during high-speed running.

Still further, the electronic flasher system is arranged such that the direction indicator lamps are connected to a semiconductor switch device, and the semiconductor switch device causes the direction indicator lamps to turn-signal flash. This provides an effect that no operating sound is generated by the semiconductor switch device per se so that the operating sound generated by the sound generator is free from interference, in contrast to the usual flasher system utilizing relays and so forth for generating an operating sound of the relays.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. An electronic flasher system, comprising:

a flasher circuit for transmitting an intermittent signal;

direction indicator lamps arranged to provide a turn-signal flashing based on the intermittent signal from the flasher circuit;

a sound generator for generating a variable turn-signal operating sound based on the intermittent signal from the flasher circuit and corresponding to the turn-signal flashing of the direction indicator lamps; and a sensor coupled with the flasher circuit for outputting an output signal depending on an operating state of a vehicle, wherein the turn-signal operating sound changes in accordance with the output signal from said sensor.

2. An electronic flasher system according to claim 1, wherein said sensor is provided with an obstacle sensor (61) for detecting an obstacle existing near the vehicle, and the turn-signal operating sound generated by said sound generator is changed in accordance with an obstacle detection signal from said obstacle sensor.

3. An electronic flasher system according to claim 2, wherein the turn-signal operating sound generated by said sound generator is changed in accordance with both an obstacle detection signal from said obstacle sensor and a vehicle-speed detection signal from a vehicle-speed sensor.

4. An electronic flasher system according to claim 3, wherein said direction indicator lamps are connected to a semiconductor switch device, and said semiconductor switch device causes said direction indicator lamps to provide a turn-signal flashing.

5. An electronic flasher system according to claim 2, wherein said direction indicator lamps are connected to a semiconductor switch device, and said semiconductor switch device causes said direction indicator lamps to provide a turn-signal flashing.

6. An electronic flasher system according to claim 1, wherein the turn-signal operating sound generated by said sound generator is changed in accordance with a vehicle-speed detection signal from a vehicle-speed sensor.

7. An electronic flasher system according to claim 6, wherein said direction indicator lamps are connected to a semiconductor switch device, and said semiconductor switch device causes said direction indicator lamps to provide a turn-signal flashing.

8. An electronic flasher system according to claim 1, wherein said direction indicator lamps are connected to a semiconductor switch device, and said semiconductor switch device causes said direction indicator lamps to provide a turn-signal flashing.

9. The electronic flasher system of claim 1, wherein the flasher circuit is located in a module unit, and wherein the module unit further comprises:

a semiconductor switch device coupled with the direction indicator lamps;

a temperature sensing device for protecting the semiconductor switch device from heat damage; and an electric-current detecting resistance for detecting a voltage drop below a predetermined level for changing a period of the intermittent signal from the flasher circuit to indicate a circuit breakage.

10. An electronic flasher system for a vehicle, comprising:

a flasher circuit means for transmitting an intermittent signal;

a semiconductor switch means for causing direction indicator lamps to flash based on the intermittent signal from the flasher circuit means;

a sound generator means for generating a variable turn-signal operating sound based on the intermittent signal from the flasher circuit means and corresponding to a turn-signal flashing of the direction indicator lamps when said semiconductor switch means causes the direction indicator lamps to flash;

a sensor means coupled with the flasher circuit means for outputting an output signal based on a detected operating state of the vehicle; and means for changing the turn-signal operating sound generated by said sound generator means in accordance with the output signal from said sensor means.

11. An electronic flasher system according to claim 10, wherein said sensor means includes an obstacle sensor means for detecting an obstacle existing around the vehicle, and said changing means changes the turn-signal operating sound generated by said sound generator means in accordance with an obstacle detection signal from said obstacle sensor means.

12. An electronic flasher system according to claim 11, wherein said changing means changes the turn-signal operating sound generated by said sound generator means in accordance with both an obstacle detection signal from said obstacle sensor means and a vehicle-speed detection signal from a vehicle-speed sensor.

13. An electronic flasher system according to claim 12, wherein said changing means changes the turn-signal operating sound generated by said sound generator means by changing a length and frequency of intermittent signals output from the flasher circuit means based on the output signal from said sensor means.

14. The electronic flasher system of claim 10, wherein the flasher circuit means and the semiconductor switch means are located in a module unit, and wherein the module unit further comprises:

a temperature sensing device for protecting the semiconductor switch means from heat damage; and an electric-current detecting resistance for detecting a voltage drop below a predetermined level for changing a period of the intermittent signal from the flasher circuit means to indicate a circuit breakage.

* * * * *